United States Patent
Choi et al.

(10) Patent No.: US 12,158,810 B2
(45) Date of Patent: *Dec. 3, 2024

(54) CONTROLLER CONTROLLING NON-VOLATILE MEMORY DEVICE, STORAGE DEVICE INCLUDING THE SAME, AND OPERATING METHOD THEREOF

(71) Applicant: SAMSUNG ELECTRONICS CO., LTD., Suwon-si (KR)

(72) Inventors: Kyungeun Choi, Hwasung-si (KR); Wooseong Cheong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,689

(22) Filed: Nov. 3, 2023

(65) Prior Publication Data
US 2024/0061746 A1 Feb. 22, 2024

Related U.S. Application Data

(63) Continuation of application No. 17/740,794, filed on May 10, 2022, now Pat. No. 11,841,767.

(30) Foreign Application Priority Data

Nov. 24, 2021 (KR) .......................... 10-2021-0162954
Jan. 17, 2022 (KR) .......................... 10-2022-0006688

(51) Int. Cl.
*H03M 13/27* (2006.01)
*G06F 11/07* (2006.01)
(Continued)

(52) U.S. Cl.
CPC ...... *G06F 11/1068* (2013.01); *G06F 11/0772* (2013.01); *G06F 13/1673* (2013.01); *G06F 13/28* (2013.01)

(58) Field of Classification Search
CPC .. G06F 13/28; G06F 13/1673; G06F 11/0772; G06F 11/1068
See application file for complete search history.

(56) References Cited

U.S. PATENT DOCUMENTS 7,679,133 B2 3/2010 Son et al.
8,341,311 B1 12/2012 SzeWerenko et al.
(Continued)

FOREIGN PATENT DOCUMENTS

JP 2007-280140 A 10/2007
JP 2008-4111 A 1/2008
(Continued)

OTHER PUBLICATIONS

Communication dated Dec. 6, 2022, issued by the European Patent Office in counterpart European Application No. 22181530.1.
(Continued)

*Primary Examiner* — Guy J Lamarre
(74) *Attorney, Agent, or Firm* — Sughrue Mion, PLLC

(57) ABSTRACT

An operating method of a storage device is provided. The operating method includes: receiving a host read command from a host device; identifying whether a read path corresponding to the host read command corresponds to a first direct memory access (DMA) read path; and directly outputting, by a host DMA manager, read data stored in an output buffer of an error correction circuit to the host device based on the read path corresponding to the first DMA read path.

20 Claims, 14 Drawing Sheets

(51) Int. Cl.
*G06F 11/10* (2006.01)
*G06F 13/16* (2006.01)
*G06F 13/28* (2006.01)
*H03M 13/25* (2006.01)
*H04L 1/00* (2006.01)
*H04L 27/34* (2006.01)

(56) References Cited

U.S. PATENT DOCUMENTS

| | | |
|---|---|---|
| 8,553,466 B2 | 10/2013 | Han et al. |
| 8,559,235 B2 | 10/2013 | Yoon et al. |
| 8,654,587 B2 | 2/2014 | Yoon et al. |
| 9,304,911 B2 | 4/2016 | Choi |
| 9,489,253 B2 | 11/2016 | Cha |
| 9,536,970 B2 | 1/2017 | Seol et al. |
| 10,466,905 B2 | 11/2019 | Lee et al. |
| 10,877,835 B2 | 12/2020 | Wang et al. |
| 11,841,767 B2 * | 12/2023 | Choi .................. G06F 3/0611 |
| 2013/0201744 A1 | 8/2013 | Pagliato et al. |
| 2013/0268803 A1 | 10/2013 | Kong et al. |
| 2016/0132265 A1 | 5/2016 | Yi et al. |
| 2018/0095663 A1 | 4/2018 | Kunimatsu et al. |
| 2018/0121106 A1 | 5/2018 | Kim |
| 2018/0342305 A1 | 11/2018 | Cha et al. |
| 2019/0051359 A1 | 2/2019 | Yoo et al. |
| 2019/0188153 A1 | 6/2019 | Benisty et al. |
| 2019/0332324 A1 | 10/2019 | Kim |
| 2020/0151055 A1 | 5/2020 | Eom et al. |
| 2021/0279138 A1 | 9/2021 | Lee |
| 2021/0326075 A1 | 10/2021 | Kim |

FOREIGN PATENT DOCUMENTS

| | | |
|---|---|---|
| JP | 5207434 B2 | 6/2013 |
| KR | 10-2012-0034746 A | 4/2012 |
| KR | 10-2013-0114303 A | 10/2013 |
| KR | 10-2014-0097061 A | 8/2014 |
| KR | 10-2018-0049338 A | 5/2018 |
| KR | 10-2018-0128235 A | 12/2018 |
| KR | 10-2019-0074194 A | 6/2019 |
| KR | 10-2019-0123984 A | 11/2019 |
| KR | 10-2020-0054402 A | 5/2020 |
| KR | 10-2021-0112872 A1 | 9/2021 |

OTHER PUBLICATIONS

Communication dated Dec. 7, 2022, issued by the Korean Intellectual Property Office in Korean Patent Application No. 10-2022-0006688.

Communication issued Apr. 5, 2023 from the Korean Intellectual Property Office in Korean Application No. 10-2022-0006688.

* cited by examiner

CONTROLLER CONTROLLING NON-VOLATILE MEMORY DEVICE, STORAGE DEVICE INCLUDING THE SAME, AND OPERATING METHOD THEREOF

CROSS-REFERENCE TO RELATED APPLICATIONS

This application is a Continuation Application of U.S. application Ser. No. 17/740,794, filed May 10, 2022, now U.S. Pat. No. 11,841,767, issued Dec. 12, 2023, which claims priority to Korean Patent Application Nos. 10-2021-0162954, filed on Nov. 24, 2021, and 10-2022-0006688, filed on Jan. 17, 2022, in the Korean Intellectual Property Office, the disclosures of which are incorporated herein by reference in their entireties.

BACKGROUND

A storage device including a non-volatile memory device may be used in a universal serial bus (USB) drive, a digital camera, a mobile phone, a smartphone, a tablet personal computer (PC), a PC, a memory card, a solid state drive (SSD), and the like. The storage device may be employed to store or move large amounts of data. Recently, the storage device has been miniaturized and implemented in an embedded form in an electronic device.

SUMMARY

Aspects of the present disclosure provide a controller with reduced read latency in a read operation, a storage device including the same, and an operating method thereof.

According to an aspect of an example embodiment, an operating method of a storage device includes: receiving a host read command from a host device; identifying whether a read path corresponding to the host read command corresponds to a first direct memory access (DMA) read path; and directly outputting, by a host DMA manager, read data stored in an output buffer of an error correction circuit to the host device based on the read path corresponding to the first DMA read path.

According to an aspect of an example embodiment, an operating method of a controller configured to control a non-volatile memory device, includes: receiving a read request from a host device; identifying a read path according to an attribute of the read request; transmitting a read command corresponding to the read request to the non-volatile memory device; receiving read data corresponding to the read command from the non-volatile memory device; performing an error correction operation on the read data to obtain error-corrected read data; and performing one from among a 1-stage direct memory access (DMA) operation and a 2-stage DMA operation according to the read path to provide the error-corrected read data to the host device.

According to an aspect of an example embodiment, a storage device includes: at least one non-volatile memory device; and a controller configured to control the at least one non-volatile memory device. The controller includes: a host interface circuit configured to interface with a host device; a non-volatile interface circuit configured to interface with the at least one non-volatile memory device; an error correction circuit configured to correct an error of read data read from the at least one non-volatile memory device and store the read data in an output buffer, and to output, under control of a host direct memory access (DMA) manager, first read data stored in the output buffer to the host interface circuit based on a read path being a first read path; and a buffer memory configured to receive the first read data from the output buffer of the error correction circuit and to output, under control of the host DMA manager, second read data to the host interface circuit based on the read path being a second read path.

According to an aspect of an example embodiment, a controller, which is configured to control at least one non-volatile memory device, includes: at least one processor; a host interface circuit configured to interface with a host device; a non-volatile memory interface circuit configured to interface with the at least one non-volatile memory device; a buffer memory; an error correction circuit includes an output buffer, wherein the error correction circuit is configured to correct an error in data read from the at least one non-volatile memory device; a host direct memory access (DMA) circuit configured to directly access the output buffer of the error correction circuit and the buffer memory through the host interface circuit; and a non-volatile memory (NVM) DMA circuit configured to directly access the at least one non-volatile memory device through the non-volatile memory interface circuit. The host DMA circuit is further configured to, based on a read path corresponding to a 1-stage DMA operation, directly obtain read data stored in the output buffer of the error correction circuit and provide the read data to the host interface circuit. The host DMA circuit is further configured to, based on the read path corresponding to a 2-stage DMA operation, control the read data stored in the output buffer of the error correction circuit to be stored in the buffer memory, obtain the read data from the buffer memory and output data of the buffer memory to the host interface circuit.

BRIEF DESCRIPTION OF DRAWINGS

The above and other aspects, features, and advantages will be more clearly understood from the following description, taken in conjunction with the accompanying drawings, in which.

DETAILED DESCRIPTION

Hereinafter, example embodiments will now be described in detail with reference to the accompanying drawings.

The present disclosure provides a controller configured to control a non-volatile memory device, a storage device including the same, and an operating method thereof. The present disclosure provides a buffer operation technique for optimizing a buffer of a memory controller and improving random read performance. The controller, the storage device, and the operating method may improve random read performance by using the buffer operation technique for optimizing the buffer of the memory controller. The controller, the storage device, and the operating method may perform a read operation by selecting one of a 1-stage direct memory access (DMA) read operation and a 2-stage DMA read operation according to an attribute of a host read request. As a result, random read latency may be reduced. In addition, the storage device may achieve a cost reduction due to a decrease in buffer size.

Figure 1:
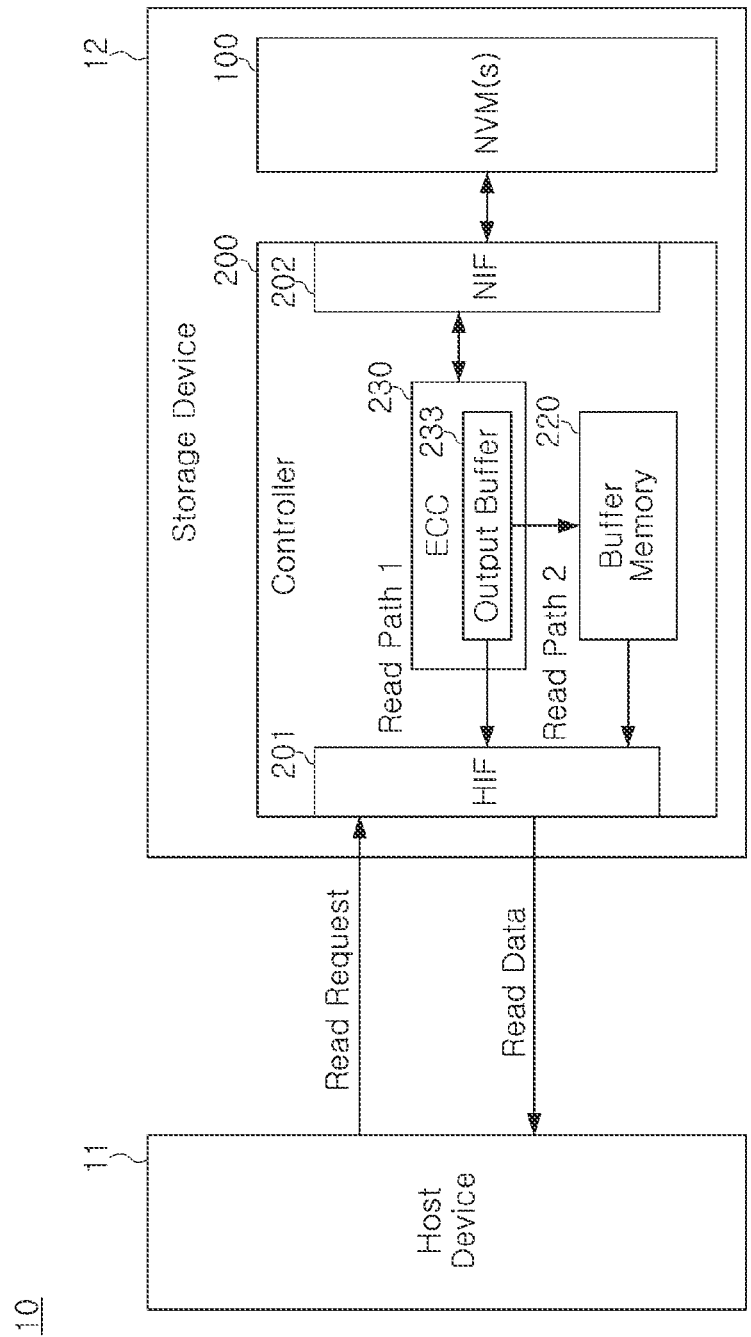
FIG. 1 is a diagram of a host system according to an example embodiment.

FIG. 1 is a diagram illustrating a host system 10 according to an example embodiment. Referring to FIG. 1, the host system 10 may include a host device 11 and a storage device 12.

The host system 10 may be implemented by a server computer, a personal computer (PC), a desktop computer, a laptop computer, a workstation computer, a network-attached storage (NAS), a data center, an Internet data center (IDC), a mobile computing device, or other computing device. For example, the mobile computing device may be implemented by a smartphone, a tablet PC, or a mobile Internet device (MID).

The host device 11 may be implemented to control a data processing operation (for example, a write operation or a read operation) of the storage device 12. The host device 11 may include at least one central processing unit (CPU), a buffer memory, a memory device, a memory controller, an interface circuit, and the like. The host device 11 may be implemented by an integrated circuit (IC), a motherboard, or a system on chip (SoC). In an example embodiment, the host device 11 may be implemented by an application processor or a mobile application processor.

The CPU may exchange commands or data with the buffer memory, the memory controller, and the interface circuit through bus architecture 210. In an example embodiment, the bus architecture may be advanced microcontroller bus architecture (AMBA), an AMBA advanced extensible interface (AXI), or an AMBA advanced high-performance bus (AHB). The buffer memory may store a queue. In an example embodiment, the buffer memory may be implemented by a register or a static random access memory (SRAM). The queue may include a submission queue. The queue may store commands (for example, write commands and read commands). In an example embodiment, the queue may further include a completion queue.

The memory device may be implemented by a volatile memory device or a non-volatile memory device. Here, the volatile memory may be implemented by a random access memory (RAM), an SRAM, or a dynamic RAM (DRAM). The non-volatile memory may be implemented by a NAND flash memory, a NOR flash memory, a phase change RAM (PRAM), a magnetoresistive RAM (MRAM), a spin-transfer torque magnetic random-access memory (STT-MRAM), a ferroelectric RAM (FRAM) or a resistive RAM (RRAM). The memory controller may write data to the memory device or read data stored in the memory device under the control of the CPU. In an example embodiment, the memory controller may have a function of a direct memory access (DMA) controller. The interface circuit may be connected to a host interface circuit (HIF) 201 of the storage device 12 through a predetermined interface. In an example embodiment, the predetermined interface may include at least one of non-volatile memory express (NVMe), peripheral component interconnect express (PCIe), serial at attachment (SATA), small computer system interface (SCSI), serial attached SCSI (SAS), universal storage bus (USB) attached SCSI (UAS), Internet small computer system interface (iSCSI), Fiber Channel, or Fiber Channel over Ethernet (FCoE).

The storage device 12 may include at least one non-volatile memory device (NVM) 100 and a controller 200.

The least one non-volatile memory device 100 may be implemented to store data. The non-volatile memory device 100 may be a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. Further, the non-volatile memory device 100 may be implemented to have a three-dimensional array structure. The present disclosure is applicable not only to a flash memory device whose charge storage layer is made-up of a conductive floating gate, but also to a charge trap flash (CTF) whose charge storage layer is made-up of an insulating film. Hereinafter, for convenience of explanation, the non-volatile memory device 100 will be referred to as a vertical NAND flash memory device (VNAND).

The controller 200 may be connected to at least one non-volatile memory device 100 through a plurality of control pins for transmitting control signals (for example, a command latch enable (CLE) signal, an address latch enable (ALE) signal, a chip enable (CE) signal, a write enable (WE) signal, and a read enable (RE) signal). Further, the controller 200 may be implemented to control the non-volatile memory device 100 by using the control signals (the CLE signal, the ALE signal, the CE signal, the WE signal, the RE signal, and the like). For example, the non-volatile memory device 100 may latch a command CMD or an address ADD at an edge of the WE signal according to the CLE signal and the ALE signal to perform a program operation, a read operation, or an erase operation. For example, the CE signal may be activated at the time of the read operation, the CLE signal may be activated during a command transmission period, the ALE signal may be activated during an address transmission period, and the RE signal may be toggled during a period in which data are transmitted through a data signal line DQ. A data strobe signal DQS may be toggled with a frequency corresponding to a data input/output speed. Read data may be sequentially transmitted in synchronization with the data strobe signal DQS.

Further, the controller 200 may be implemented to control an overall operation of the storage device 12. The controller 200 may perform various management operations such as cache/buffer management, firmware management, garbage collection management, wear leveling management, data deduplication management, read refresh/reclaim management, bad block management, multi-stream management, management of mapping of host data and a non-volatile memory, quality of service (QoS) management, system resource allocation management, non-volatile memory queue management, read level management, erase/program management, hot/cold data management, power loss protection management, dynamic thermal management, initialization management, and redundant array of inexpensive disk (RAID) management.

In addition, the controller 200 may include the host interface circuit (HIF) 201, a non-volatile memory interface circuit (NIF) 202, a buffer memory 220, and an error correction circuit 230.

The host interface circuit (HIF) 201 may be implemented to provide a function of interfacing with the host device 11. The host interface circuit 201 may exchange data with the host device 11 through the NVMe, the PCIe, the SATA, the SCSI, the SAS, the UAS, the iSCSI, the Fiber Channel, the FCoE, or the like.

The non-volatile memory interface circuit (NIF) 202 may exchange data through the plurality of pins described above in the non-volatile memory device 100. In particular, the non-volatile memory interface circuit 202 may support an extended command protocol.

The buffer memory 220 may be implemented to temporarily store data necessary for the operation of the storage device 12. In an example embodiment, the buffer memory 220 may be implemented by an SRAM.

The error correction circuit 230 may be implemented to generate an error correction code of data at the time of the write operation and correct an error by using the error correction code corresponding to read data at the time of the read operation.

At the time of the read operation, the controller 200 of the storage device 12 may transmit, from an output buffer 233 of the error correction circuit 230 to the host device 11, the read data by one DMA operation according to the attribute of the host command (or read request). For example, the attribute may indicate whether a read request corresponds to a random read operation. In an example embodiment, the controller 200 may directly transmit the read data from the output buffer 233 of the error correction circuit 230 to the host device 11 according to an option (the attribute of the host command or a request from a user), or may move the read data from the output buffer 233 to a buffer memory 222 and then transmit the read data from the buffer memory 222 to the host device 11. That is, the controller 200 may select one of a first read path and a second read path, and transmit the read data to the host device 11 by using the selected read path. Here, the first read path may be a path using one DMA operation, and the second read path may be a path using two DMA operations.

A general controller of a storage device has a buffer memory (for example, SRAM) of a predetermined size (for example, NAND page size x number of NAND channels x buffer ratio) as a read buffer for the read operation. The general controller transmits read data to the host device through the 2-stage DMA operation regardless of an attribute of a host read command. The general controller transmits data to the host device after the same initial latency as other read commands, even in a random read operation that does not need to collect data for transmission.

On the other hand, the controller 200 of the storage device 12 according to an example embodiment may transmit, from the output buffer 233 of the error correction circuit 230 to the host device 11, the read data by one DMA operation according to a random read request or a request from the user. Accordingly, the controller 200 according to example embodiments may reduce latency of the read operation and enable a decrease in size of the buffer memory 220 (for example, SRAM) used as the read buffer, compared to the related art.

Performance improvement of the storage device 12 according to an example embodiment may be expected by reducing the initial latency in the random read operation. In addition, the storage device 12 according to example embodiments may achieve a cost reduction due to a decrease in size of the buffer memory 220 in the storage device 12.

Figure 2:
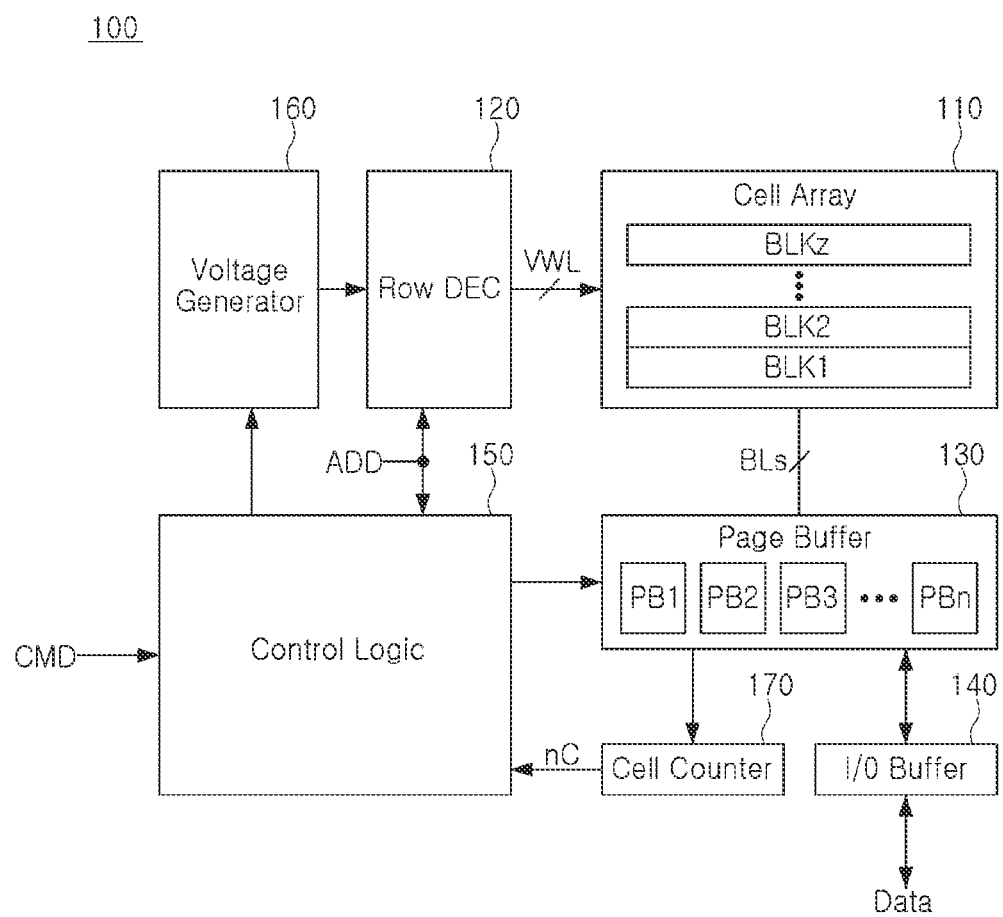
FIG. 2 is a diagram of a non-volatile memory device according to an example embodiment.

FIG. 2 is a diagram illustrating the non-volatile memory device 100 according to an example embodiment. Referring to FIG. 2, the non-volatile memory device 100 may include a memory cell array 110, a row decoder 120, a page buffer circuit 130, an input/output circuit 140, a control logic 150, a voltage generator 160, and a cell counter 170.

The memory cell array 110 may be connected to the row decoder 120 through word lines WL or selection lines SSL and GSL. The memory cell array 110 may be connected to the page buffer circuit 130 through bit lines BL. The memory cell array 110 may include a plurality of cell strings. A channel of each of the cell strings may be formed in a vertical or horizontal direction. Each of the cell strings may include a plurality of memory cells. Here, the plurality of memory cells may be programmed, erased, or read based on a voltage provided to the bit lines BL or the word lines WL. In general, the program operation is performed in units of pages, and the erase operation is performed in units of blocks. In an example embodiment, the memory cell array 330 may include a two-dimensional (2D) memory cell array, and the 2D memory cell array may include a plurality of NAND strings arranged in a row direction and a column direction.

The row decoder 120 may be implemented to select one of memory blocks BLK1 to BLKz of the memory cell array 110 according to the address ADD. The row decoder 120 may select one of the word lines of the selected memory block according to the address ADD. The row decoder 120 may transfer a word line voltage VWL corresponding to the operation mode to the selected word line of the memory block. At the time of the program operation, the row decoder 120 may apply a program voltage and a verify voltage to the selected word line, and may apply a pass voltage to an unselected word line. At the time of the read operation, the row decoder 120 may apply a read voltage to the selected word line, and may apply a read pass voltage to an unselected word line.

The page buffer circuit 130 may be implemented to be operated as a write driver or a sense amplifier. At the time of the program operation, the page buffer circuit 130 may apply a bit line voltage corresponding to data to be programmed to the bit lines of the memory cell array 110. At the time of the read operation or a verify read operation, the page buffer circuit 130 may sense data stored in a selected memory cell through the bit line BL. Each of a plurality of page buffers included in the page buffer circuit 130 may be connected to at least one bit line.

The input/output circuit 140 may provide externally provided data to the page buffer circuit 130. The input/output circuit 140 may provide an externally provided command CMD to the control logic 150 (see FIG. 1). The input/output circuit 140 may provide an externally provided address ADD to the control logic 150 or the row decoder 120. Further, the input/output circuit 140 may output data sensed and latched by the page buffer circuit 130 to another device.

The control logic 150 may be implemented to control the row decoder 120, the page buffer circuit 130, and the voltage generator 160 based on the command CMD transmitted from the controller 200. Further, the control logic 150 may be implemented to perform a cell count-based dynamic read operation.

The voltage generator 160 may be implemented to generate various types of word line voltages to be applied to the respective word lines and a well voltage to be supplied to a bulk (for example, a well region) in which the memory cells are formed under the control of the control logic 150. The word line voltages applied to the respective word lines may include the program voltage, the pass voltage, the read voltage, the read pass voltages, and the like.

The cell counter 170 may be implemented to count memory cells corresponding to a specific threshold voltage range from data sensed by the page buffer circuit 130. For example, the cell counter 170 may count the number of memory cells having a threshold voltage in the specific threshold voltage range by processing data sensed by each of a plurality of page buffers PB1 to PBn.

Figure 3:
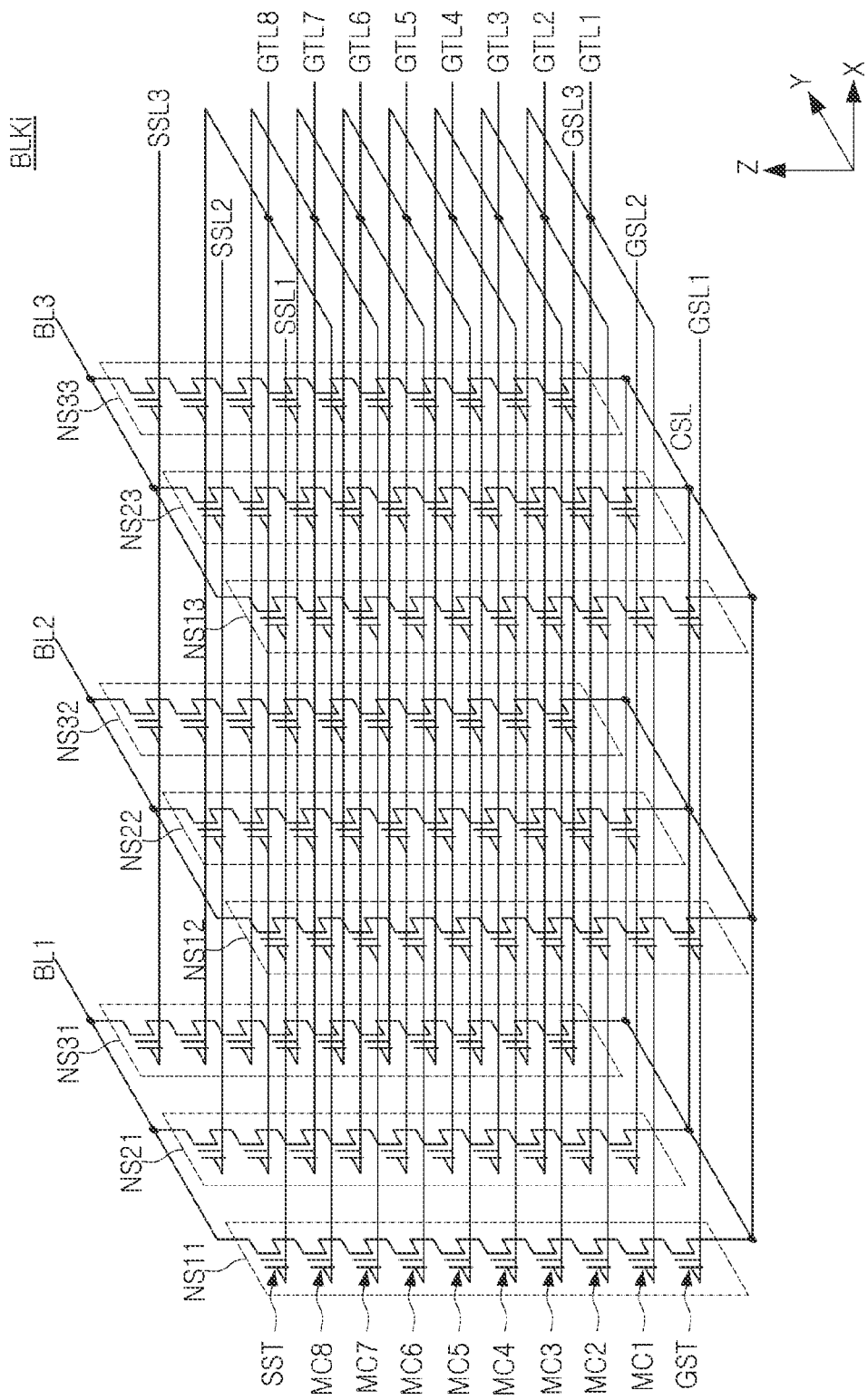
FIG. 3 is a circuit diagram of a memory block according to an example embodiment.

FIG. 3 illustrates a circuit diagram of a memory block BLKi (i is an integer of 2 or more) according to an example embodiment. A plurality of memory NAND strings included in the memory block BLKi may be formed in a direction perpendicular to a substrate.

Referring to FIG. 3, the memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1, MC2, . . . , and MC8, and a ground selection transistor GST. FIG. 3 illustrates a case in which each of the plurality of memory NAND strings NS11 to NS33 includes eight memory cells MC1, MC2, . . . , and MC8, but example embodiments are not necessarily limited thereto.

The string selection transistor SST may be connected to a corresponding string selection line SSL1, SSL2, or SSL3. The plurality of memory cells MC1, MC2, . . . , and MC8 may be connected to corresponding gate lines GTL1, GTL2, . . . , and GTL8, respectively. The gate lines GTL1, GTL2, . . . , and GTL8 may correspond to word lines, and some of the gate lines GTL1, GTL2, . . . , and GTL8 may correspond to dummy word lines. The ground selection transistor GST may be connected to a corresponding ground selection line GSL1, GSL2, or GSL3. The string selection transistor SST may be connected to a corresponding bit line BL1, BL2, or BL3, and the ground selection transistor GST may be connected to the common source line CSL.

Word lines (for example, WL1) having the same height may be connected in common, and the ground selection lines GSL1, GSL2, and GSL3 and the string selection lines SSL1, SSL2, and SSL3 may be separated from each other, respectively. FIG. 3 illustrates a case in which the memory block BLK is connected to eight gate lines GTL1, GTL2, . . . , and GTL8 and three bit lines BL1, BL2, and BL3, but example embodiments are not necessarily limited thereto.

Figure 4:
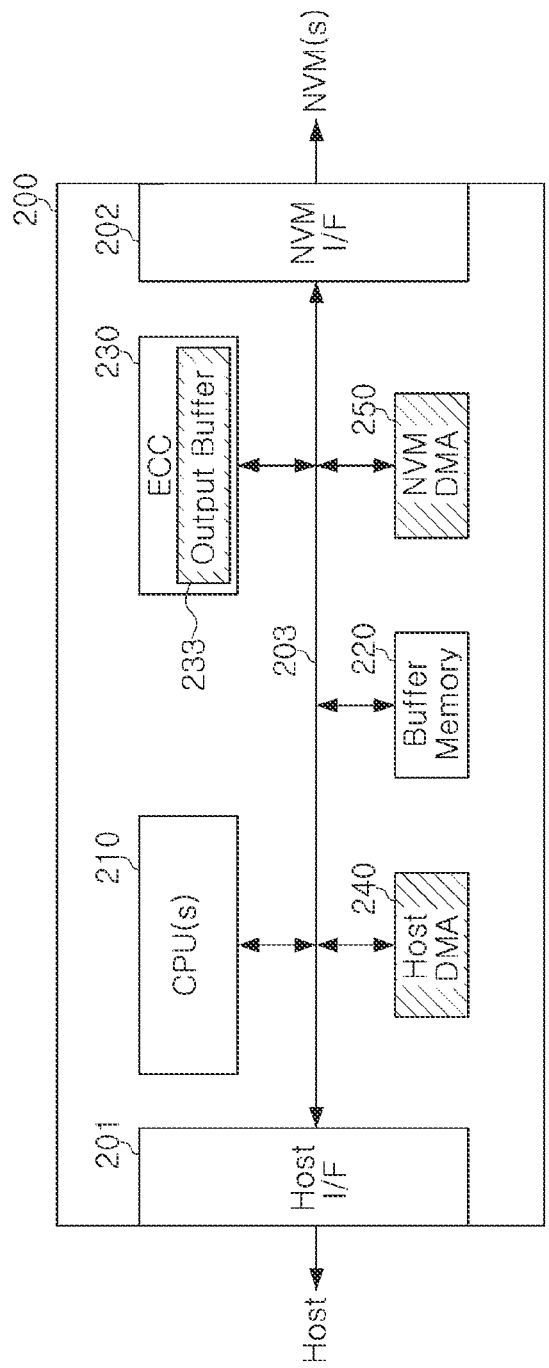
FIG. 4 is a diagram of a 200 according to an example embodiment.

FIG. 4 is a diagram illustrating the controller 200 according to an example embodiment. Referring to FIG. 4, the controller 200 may include the host interface circuit 201, the non-volatile memory interface circuit 202, a bus 203, at least one processor (CPU) 210, the buffer memory 220, the error correction circuit (ECC) 230, a host DMA circuit 240, and a non-volatile memory DMA circuit 250. The output buffer 233 may be provided in the ECC 230.

The host interface circuit 201 may be implemented to transmit a packet to and receive a packet from the host. The packet transmitted from the host to the host interface circuit 201 may include a command or data to be written to the non-volatile memory device 100. The packet transmitted from the host interface circuit 201 to the host may include a response to a command or data read from the non-volatile memory device 100.

The memory interface circuit 202 may transmit data to be written to the non-volatile memory device 100 to the non-volatile memory device 100, or receive data read from the non-volatile memory device 100. Such a memory interface circuit 202 may be implemented to comply with a standard convention such as JEDEC Toggle or open NAND flash interface (ONFI).

At least one processor (CPU) 210 may be implemented to control the overall operation of the storage device 12. The controller 200 may perform, under control of the at least one CPU 210, various management operations such as cache/buffer management, firmware management, garbage collection management, wear leveling management, data deduplication management, read refresh/reclaim management, bad block management, multi-stream management, management of mapping of host data and a non-volatile memory, quality of service (QoS) management, system resource allocation management, non-volatile memory queue management, read level management, erase/program management, hot/cold data management, power loss protection management, dynamic thermal management, initialization management, and redundant array of inexpensive disk (RAID) management. Such management operations may be implemented in hardware, firmware, or software.

The buffer memory 220 may temporarily store data to be written to the non-volatile memory device 100 or data read from the non-volatile memory device 100. In an example embodiment, the buffer memory 220 may be provided in the controller 200. In another example embodiment, the buffer memory 220 may be disposed outside the controller 200. In addition, the buffer memory 220 may be implemented by a volatile memory (for example, a static random access memory (SRAM), a dynamic RAM (DRAM), or a synchronous RAM (SDRAM)) or a non-volatile memory (a flash memory, a phase-change RAM (PRAM), a magnetoresistive RAM (MRAM), a resistive RAM (ReRAM), or a ferroelectric RAM (FRAM)).

The error correction circuit 230 may be implemented to generate the error correction code (ECC) at the time of the program operation and recover data by using the error correction code at the time of the read operation. That is, the error correction circuit 230 may generate the error correction code (ECC) for correcting a fail bit or an error bit corresponding to data received from the non-volatile memory device 100. Further, the error correction circuit 230 may form data to which a parity bit is added by performing error correction encoding on data provided to the non-volatile memory device 100. The parity bit may be stored in the non-volatile memory device 100.

Further, the error correction circuit 230 may perform error correction decoding on data output from the non-volatile memory device 100. The error correction circuit 230 may correct an error by using parity. The error correction circuit 230 may correct an error by using a low density parity check (LDPC) code, a Bose-Chaudhuri-Hocquenghem (BCH) code, a turbo code, a Reed-Solomon code, a convolution code, a recursive systematic code (RSC), and coded modulation such as trellis-coded modulation (TCM) or block coded modulation (BCM). When error correction is impossible in the error correction circuit 230, a read retry operation may be performed.

A packet manager may generate a packet according to a protocol of an interface agreed by the host, or parse various information from a packet received from the host. An encryption device may perform at least one of an encryption operation or a decryption operation on data input to the controller 200 by using a symmetric-key algorithm. The encryption device may perform encryption and decryption of data by using an advanced encryption standard (AES) algorithm. The encryption device may include an encryption module and a decryption module. In an example embodiment, the encryption device may be implemented in hardware, software, or firmware. The encryption device may perform a self encryption disk (SED) function or a trusted computing group (TCG) security function. With the SED function, encrypted data may be stored in the non-volatile memory device 100 using an encryption algorithm or encrypted data read from the non-volatile memory device 100 may be decrypted. Such an encryption or decryption operation may be performed using an internally generated encryption key. The TCG security function may provide a mechanism that enables access control to user data of the storage device 12. For example, with the TCG security function, a procedure for authentication between an external device and the storage device 12 may be performed. In an example embodiment, the SED function or the TCG security function is optionally enabled.

The host DMA circuit 240 may be implemented to control a DMA operation between the host device 11 and the controller 200. The host DMA circuit 240 may perform an operation of storing data input from the host device 11 through the host interface circuit 201 in the buffer memory 220 at the time of the program operation under the control of a host controller. Further, the host DMA circuit 240 may perform an operation of outputting data stored in the buffer memory 220 to the host device 11 through the host interface circuit 201 at the time of the read operation. In an example embodiment, the host DMA circuit 240 may be implemented to be included in the host controller as a component of the host controller.

The non-volatile memory DMA circuit 250 may be implemented to control a DMA operation between the controller 200 and the non-volatile memory device 100. The non-volatile memory DMA circuit 250 may perform an operation of outputting data stored in the buffer memory 220 to the non-volatile memory device 100 through the non-volatile memory interface circuit 202 at the time of the program operation under the control of a non-volatile memory controller. In addition, the non-volatile memory DMA circuit 250 may perform an operation of reading data stored in the non-volatile memory device 100 through the non-volatile memory interface circuit 202 at the time of the read operation.

In addition, the non-volatile memory DMA circuit 250 may receive at least one data group constituting a read transmission unit from the non-volatile memory interface circuit 202 at the time of the read operation. The non-volatile memory DMA circuit 250 may divide each data group into at least two data subgroups having a data size unit smaller than the read transmission unit. Here, the data subgroups may be data error-corrected by the error correction circuit 230. In an example embodiment, when the first read path is selected, the at least two data subgroups may be transmitted to the host DMA circuit 240. Also, when the second read path is selected, the at least two data subgroups may be sequentially transmitted to the buffer memory 220.

In addition, when transmitting the data subgroups to the buffer memory 220, the non-volatile memory DMA circuit 250 may output information indicating a start of read streaming to a buffer controller. For example, the non-volatile memory DMA circuit 250 may be implemented to be included in the non-volatile memory controller as a component of the non-volatile memory controller.

Figure 5:
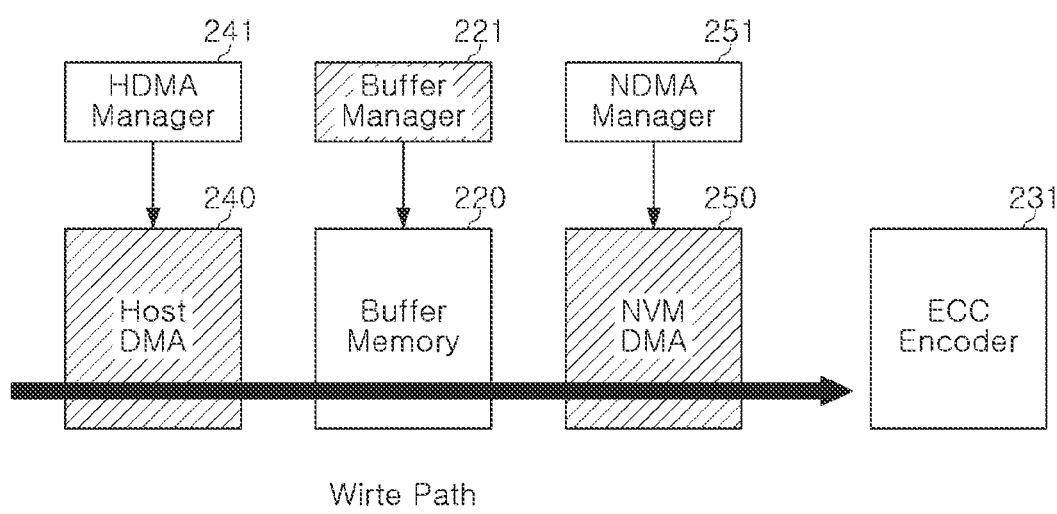
FIG. 5 is a diagram illustrating a write path of a storage device according to an example embodiment.

FIG. 5 is a diagram illustrating a write path of the storage device 12 according to an example embodiment.

A host DMA (HDMA) manager 241 may manage the host DMA circuit 240 at the time of the write operation. The host DMA circuit 240 may receive data of the host device 11 (FIG. 1) through the host interface circuit 201 (FIG. 1). The host DMA circuit 240 may sequentially receive at least one data group constituting a transmission unit from the host device 11. The HDMA manager 241 may divide a data group constituting the transmission unit into at least two data subgroups, and sequentially transmit the at least two data subgroups to the buffer memory 220. That is, the HDMA manager 241 may divide one data group having a data size of the transmission unit into at least two data subgroups having a data size smaller than the transmission unit and transmit the at least two data subgroups to the buffer memory 220.

The HDMA manager 241 may output a program streaming start signal to a schedule engine of the buffer manager 221 when transmitting the first data subgroup among the at least two data subgroups to the buffer memory 220. Here, the schedule engine may output a data storage reservation signal to the buffer memory 220 based on the program streaming start signal. The buffer memory 220 may secure a storage space equivalent to the total data size of at least one data group based on the data storage reservation signal to prepare for the write operation of the buffer memory 220.

The HDMA manager 241 may output a transmission completion signal to the buffer manager 221 after transmitting the first data subgroup among the at least two data subgroups to the buffer memory 220. The HDMA manager 241 may output a slot index including location information of the data storage space of the buffer memory 220 to a non-volatile DMA (NDMA) manager 251 based on the transmission completion signal.

The NDMA manager 251 may control the non-volatile memory DMA circuit 250 to read data stored in the buffer memory 220 after the storage of at least the first data subgroup among the two data subgroups in the buffer memory 220 is completed, and output the read data to the non-volatile memory device 100 through the non-volatile memory interface circuit 202 (FIG. 1).

The NDMA manager 251 may output a driving signal based on the slot index. The non-volatile memory DMA circuit 250 may read data stored in the buffer memory 220 based on the driving signal, and output the read data to an encoder 231 of the error correction circuit.

In summary, the storage device 12 according to an example embodiment may perform an operation of outputting, with the non-volatile memory DMA circuit 250, data stored in the buffer memory 220 to the encoder 231 of the error correction circuit 230 while performing an operation of transmitting, by the host DMA circuit 240, data received from the host to the buffer memory 220 at the time of the write operation.

Figure 6A:
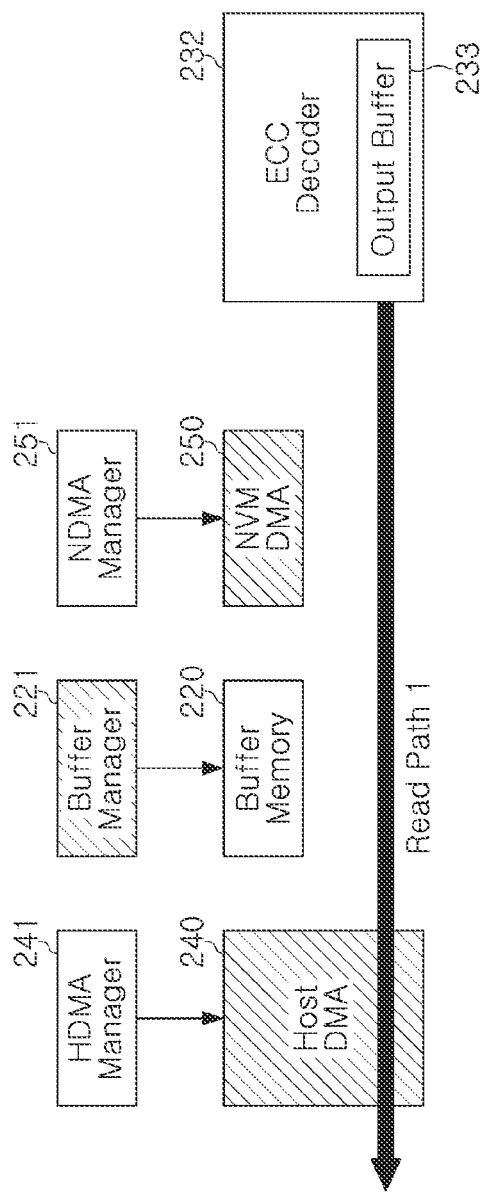
FIGS. 6A and 6B are diagrams illustrating read paths of a storage device according to an example embodiment.
Figure 6B:
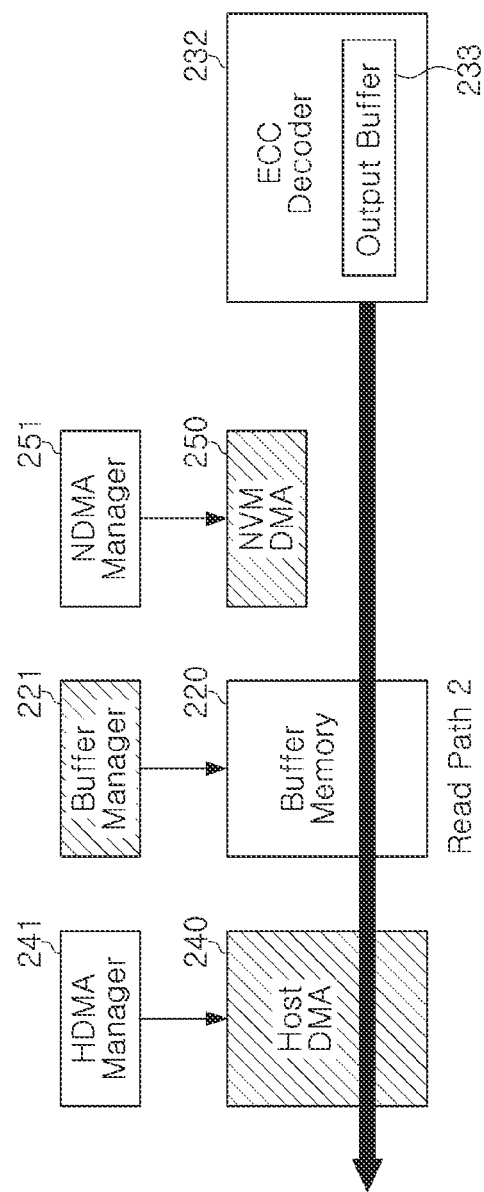

FIGS. 6A and 6B are diagrams illustrating the read paths of the storage device 12 according to an example embodiment. FIG. 6A illustrates the first read path that does not pass through the buffer memory 220, and FIG. 6B illustrates the second read path that passes through the buffer memory 220.

Regardless of the selection of the first and second read paths, data output from the non-volatile memory device 100 may be received through the non-volatile memory interface circuit 202 at the time of the read operation. Here, the received data may be data error-corrected through a decoder 232 of the error correction circuit 230. In an example embodiment, the non-volatile memory DMA circuit 250 may sequentially receive at least one data group constituting the read transmission unit from the non-volatile memory device 100.

Referring to FIG. 6A, the HDMA manager 241 may control the host DMA circuit 240 to output data stored in the output buffer 233 of the ECC decoder 232 to the host device 11 through the host interface circuit 201.

Referring to FIG. 6B, the HDMA manager 241 may control the host DMA circuit 240 to perform a first DMA read operation of directly transmitting data stored in the output buffer 233 of the ECC decoder 232 to the buffer memory 220, and a second DMA read operation of directly transmitting data stored in the buffer memory 220 to the host device 11 through the host interface circuit 201.

In the first DMA read operation, the HDMA manager 241 may divide a data group constituting the read transmission unit into at least two data subgroups, and sequentially transmit the at least two data subgroups to the buffer memory 220. That is, the HDMA manager 241 may divide one data group having a data size of the read transmission unit into at least two data subgroups having a data size smaller than the read transmission unit and transmit the at least two data subgroups to the buffer memory 220. The HDMA manager 241 may output a read streaming start signal to the schedule engine of the buffer manager 221 when transmitting the first data subgroup among the at least two data subgroups to the buffer memory 220. The schedule engine may output a data storage reservation signal to the buffer memory 220 based on the read streaming start signal. The buffer memory 220 may secure a storage space equivalent to the total data size of at least one data group based on the data storage reservation signal to prepare for the write operation of the buffer memory 220. Further, the HDMA manager 241 may output a transmission complete signal to the buffer memory 220 after transmitting the first data subgroup among the at least two data subgroups to the buffer memory 220.

In the second DMA read operation, the HDMA manager 241 may control the host DMA circuit 240 to output data stored in the buffer memory 220 to the host device 11 through the host interface circuit 201 after the storage of at least the first data subgroup among the two data subgroups in the buffer memory 220 is completed. The HDMA manager 241 may output a driving signal for driving the host DMA circuit 240 based on the slot index. The host DMA circuit 240 may read and output data stored in the buffer memory 220 based on the driving signal. The host DMA circuit 240 may sequentially read the data subgroups stored in the buffer memory 220 and output the read data subgroups to the host device 11 through the host interface circuit 201.

Figure 7:
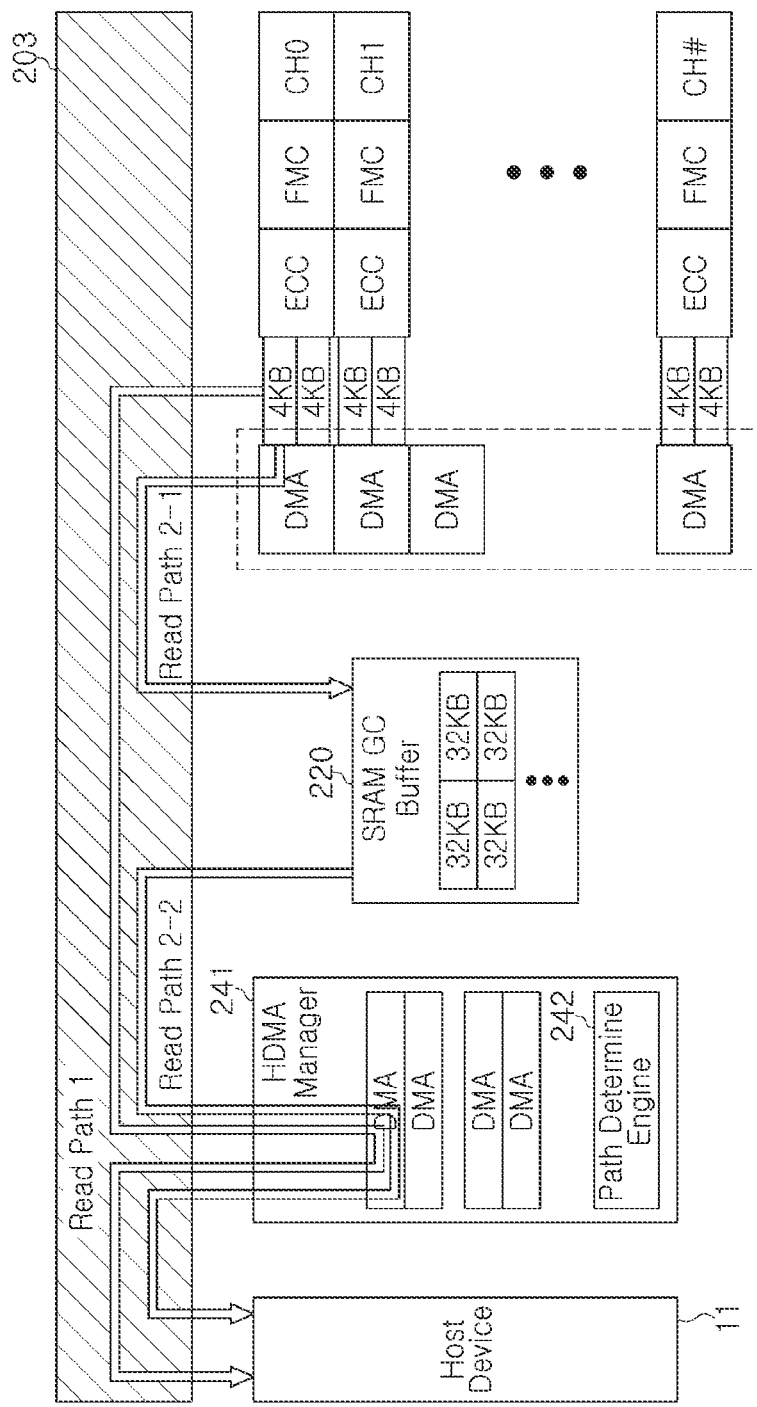
FIG. 7 is a diagram illustrating a method of selectively applying a read path according to an example embodiment.

FIG. 7 is a diagram illustrating a method of selectively applying the read path by the controller 200 according to an example embodiment.

Referring to FIG. 7, a host read path may be classified into two paths. Through the first read path (i.e., Read Path 1), read data may be transmitted to the host device 11 by one DMA operation. Through the second read path (i.e., Read Path 2 which includes Read Path 2-1 and Read Path 2-2), read data may be transmitted to the host device 11 by two DMA operations.

When the first read path is selected as the host read path, read data (for example, 4 KB data) may be output from the output buffer 233 of the error correction circuit 230 (see FIG. 1) to the host device 11 through the 1-stage DMA operation. Here, the 1-stage DMA operation may be an operation of transmitting read data of the output buffer 233 of the error correction circuit 230 to the host device 11 by the HDMA manager 241.

When the second read path is selected as the host read path, read data (for example, 4 KB) may be output from the output buffer 233 of the error correction circuit 230 (see FIG. 1) to the host device 11 through the 2-stage DMA operation. Here, the 2-stage DMA operation may include an operation of transmitting read data (for example, 4 KB data) of the output buffer 233 of the error correction circuit 230 to the buffer memory 220 (SRAM garbage collection (GC) Buffer) by the HDMA manager 241 and an operation of transmitting read data (for example, 32 KB data) collected in the buffer memory 220 to the host device 11 by the HDMA manager 241.

Data read by a flash memory controller FMC controlling at least one non-volatile memory device connected to each of a plurality of channels CH0, CH1, . . . , and CH # may be error-corrected by the error correction circuit ECC. The error-corrected data (for example, 4 KB) of each channel may be stored in an output buffer of the error correction circuit ECC. The HDMA manager 241 may determine whether to transmit the error-corrected data stored in the output buffer to the buffer memory 220 or to the host interface circuit. For example, the HDMA manager 241 may determine whether to transmit the error-corrected data stored in the output buffer to the host interface circuit through the first read path Read Path 1 or the second read path Read Path 2.

The storage device 12 according to an example embodiment may classify the host read path into two paths and transmit data from the output buffer 233 of the error correction circuit 230 to the host device 11 by only one DMA operation or transmit data to the host device 11 via the SRAM GC buffer 22 according to the attribute of the host command or the need of the user. Such a method of selectively applying the read path may be used to optimize the read operation. In particular, in the read operation using the first read path Read Path 1, the read latency may be reduced by transferring data to the host device 11 by only one DMA operation. That is, the storage device 12 according to an example embodiment may reduce the latency of the read operation by selecting one of two read paths according to the attribute of the host command and the need of the user.

In addition, because a size of the buffer memory (for example, SRAM) according to example embodiments may be designed to be smaller than a size of a read buffer according to the related art, costs may be reduced. In an example embodiment, an LDPC output SRAM may be used as a read buffer, thereby reducing or eliminating a dedicated read buffer.

As illustrated in FIG. 7, the HDMA manager 241 may include a path determination engine 242 that determines the read path. The path determination engine 242 may determine the read path depending on whether to perform the 1-stage DMA operation or the 2-stage DMA operation at the time of the read operation.

Figure 8:
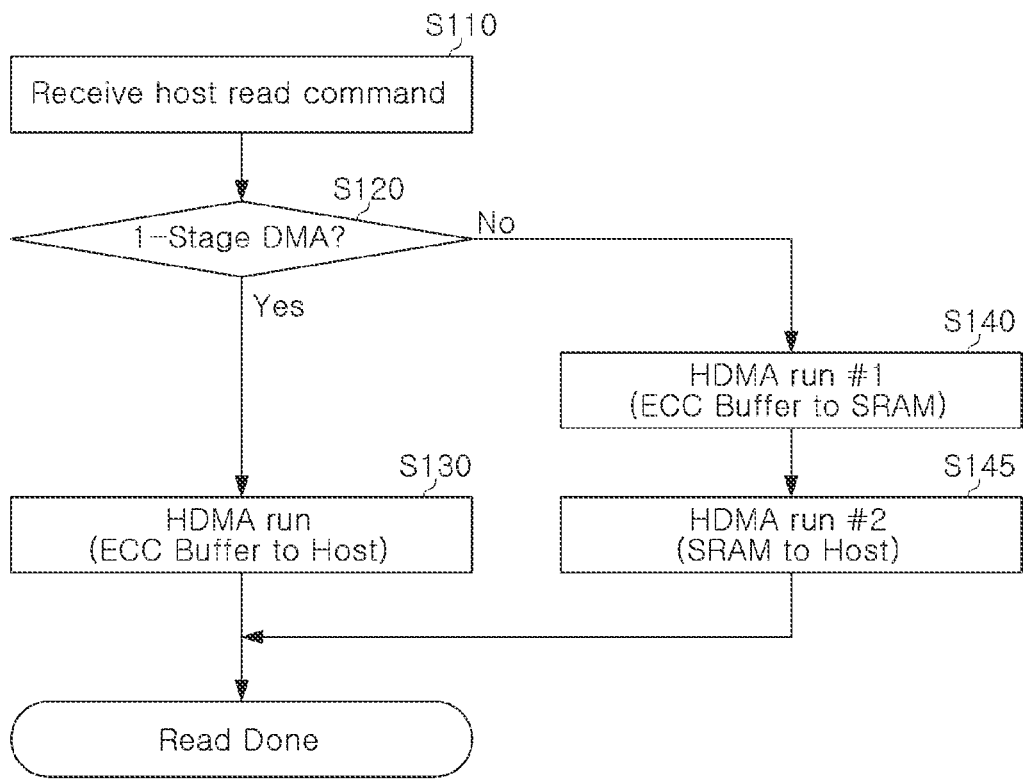
FIG. 8 is a flowchart of an operating method of a storage device according to an example embodiment.

FIG. 8 is a flowchart illustrating an operating method of the storage device 12 according to an example embodiment. Referring to FIG. 8, the storage device 12 may be operated as follows.

The storage device 12 may receive a host read command from the host device 11 (S110). The storage device 12 may determine whether to perform the 1-stage DMA operation according to a read request (S120).

When the read operation using the 1-stage DMA operation is performed, the storage device 12 may execute HDMA to transmit read data of the output buffer 233 of the error correction circuit 230 (see FIG. 1) to the host device 11 (S130). On the other hand, when the read operation using the 1-stage DMA operation is not performed, the storage device 12 perform a 2-stage DMA operation. In particular, the storage device 12 may execute first HDMA to transmit the read data of the output buffer 233 of the error correction circuit 230 (see FIG. 1) to the buffer memory 220 (SRAM) (S140). Thereafter, the storage device 12 may execute second HDMA to transmit the read data of the buffer memory 220 (SRAM) to the host device 11 (S145).

Figure 9:
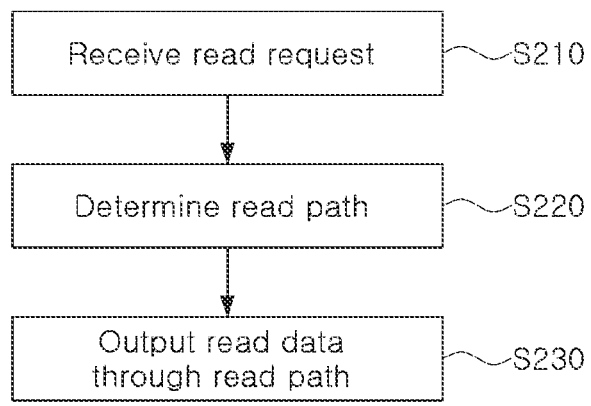
FIG. 9 is a flowchart of an operating method of a controller according to an example embodiment.

FIG. 9 is a flowchart illustrating an operating method of the controller according to an example embodiment. Referring to FIG. 9, the controller 200 may be operated as follows.

The controller 200 may receive a read request from the host device 11 (S210). The controller 200 may determine a read path according to the read request (S220). Here, the read path may include the first read path for the 1-stage DMA operation or the second read path for the 2-stage DMA operation. The controller 200 may output read data through the selected read path (S230).

Figure 10:
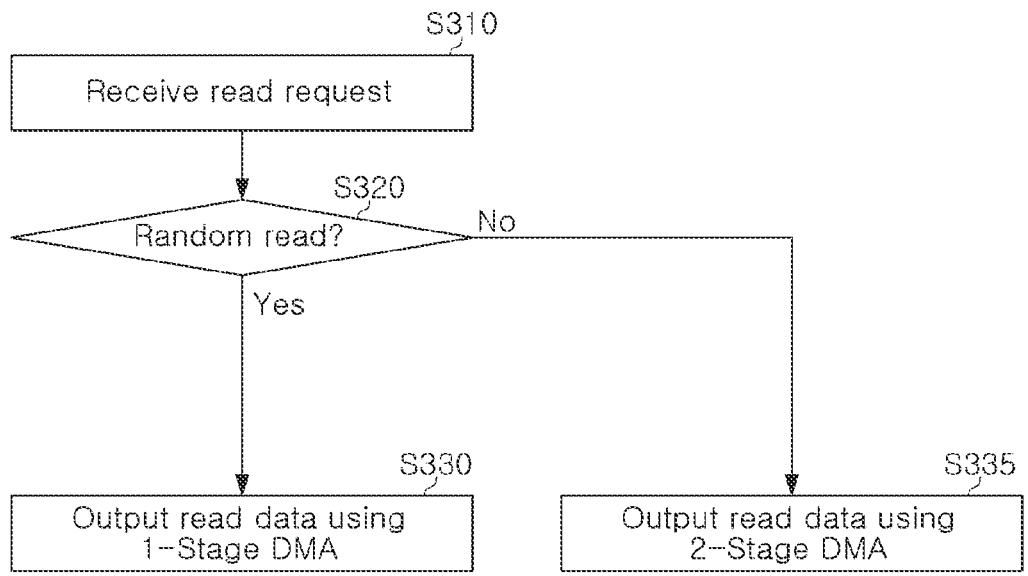
FIG. 10 is a flowchart illustrating an operating method of a controller according to an example embodiment.

FIG. 10 is a flowchart illustrating an operating method of the controller according to another example embodiment. Referring to FIG. 10, the controller 200 may be operated as follows.

The controller 200 may receive a read request from the host device 11 (S310). The controller 200 may determine whether the read operation is the random read operation by analyzing the read request (S320). When the read operation is the random read operation, the controller 200 may output read data to the host device 11 by using the 1-stage DMA operation (S330). On the other hand, when the read operation is not the random read operation, the controller 200 may output read data to the host device 11 by using the 2-stage DMA operation (S335).

Figure 11:
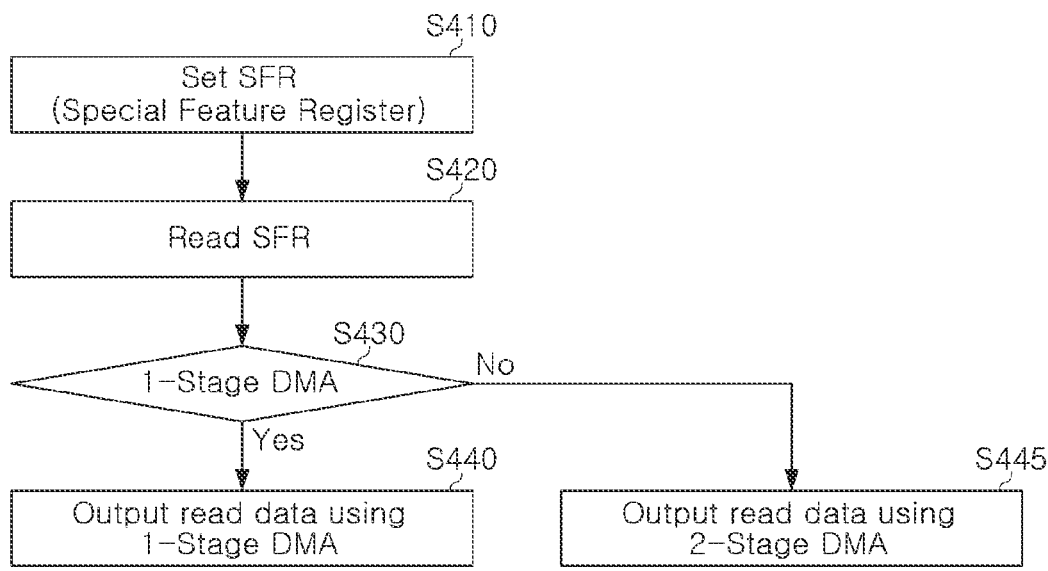
FIG. 11 is a flowchart illustrating an operating method of a controller according to an example embodiment.

FIG. 11 is a flowchart illustrating an operating method of the controller according to another example embodiment. Referring to FIG. 11, the controller 200 may be operated as follows.

The controller 200 may set a special feature register (SFR) to fix the read path according to a request from the host device 11 (S410). For example, the request from the host device 11 may indicate the 1-stage DMA. Once the read request is received from the host device 11, the controller 200 may preferentially read the SFR (S420). It may be determined whether the read path is a read path for the 1-stage DMA operation according to the SFR (S430).

When the SFR indicates the read path for the 1-stage DMA operation, the controller 200 may output read data to the host device 11 (S440). On the other hand, when the SFR does not indicate the read path for the 1-stage DMA operation, the controller 200 may output the read data to the host device 11 by using the 2-stage DMA operation (S445).

Figure 12:
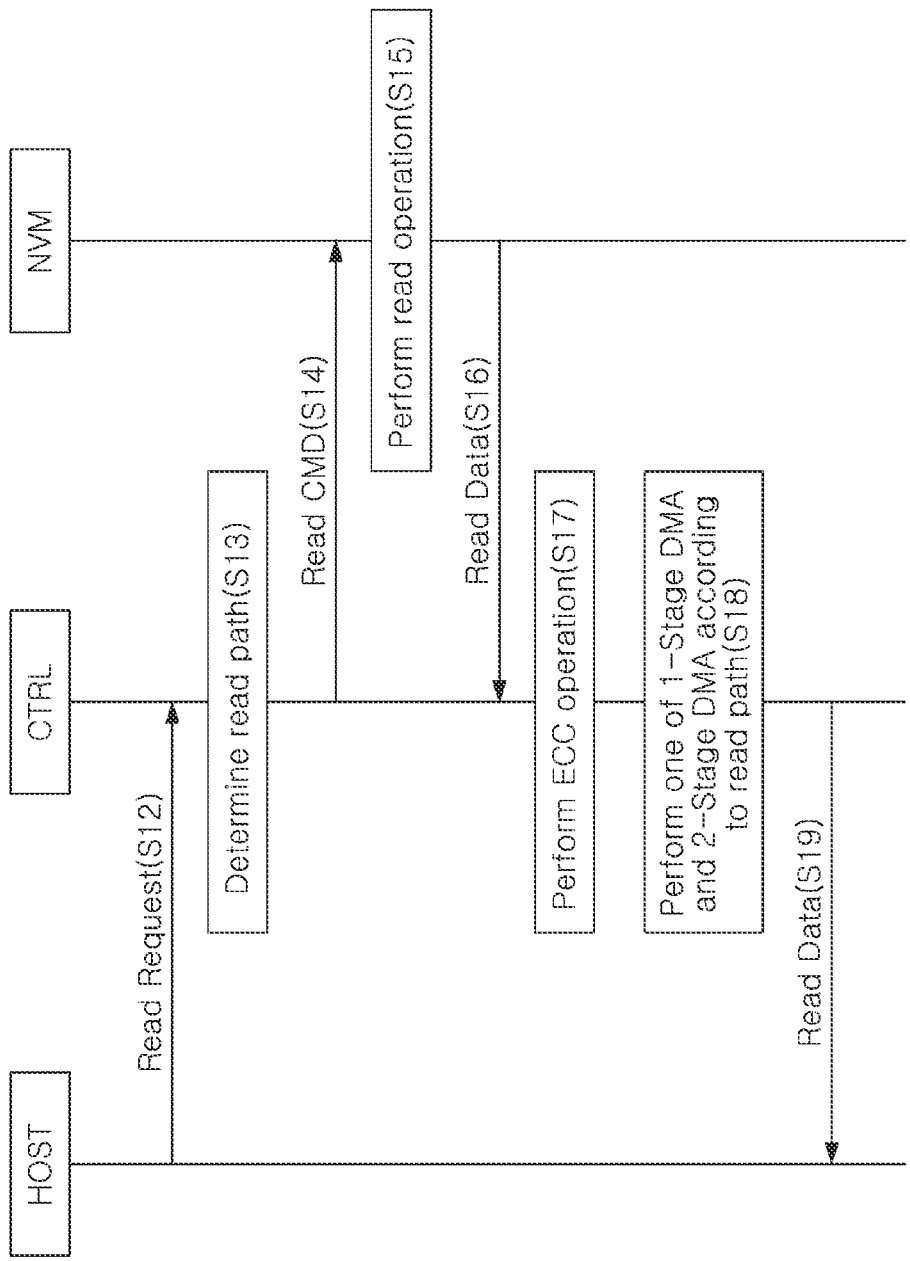
FIG. 12 is a ladder diagram illustrating an operating method of a host system according to an example embodiment.

FIG. 12 is a ladder diagram illustrating an operating method of the host system according to an example embodiment. Referring to FIG. 12, the host system may be operated as follows.

A host device HOST may transmit a read request to a controller CTRL of the storage device (S12). The controller CTRL may receive the read request and determine a read path (S13). The controller CTRL may transmit a read command corresponding to the read request to a non-volatile memory device NVM (S14). The non-volatile memory device NVM may perform the read operation based on the read command (S15). The non-volatile memory device NVM may output read data to the controller CTRL (S16). The controller CTRL may perform the error correction operation on the read data (S17). The controller CTRL may perform a DMA operation corresponding to the selected read path on the error-corrected data (S18). Here, the DMA operation may be the 1-stage DMA operation or the 2-stage DMA operation. According to the DMA operation, the read data may be output to the host device HOST (S19).

Figure 13:
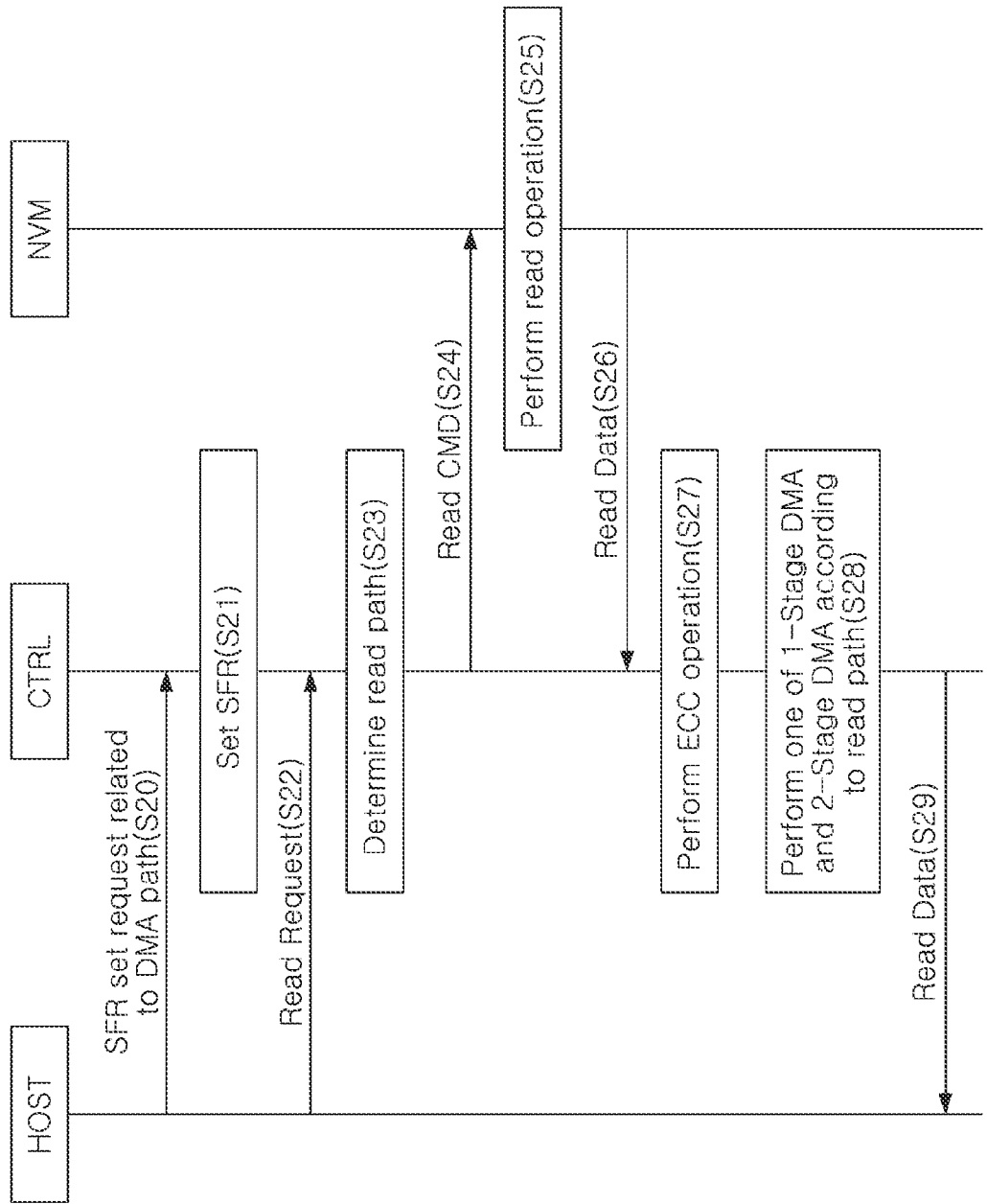
FIG. 13 is a ladder diagram illustrating an operating method of a host system according to an example embodiment.

FIG. 13 is a ladder diagram illustrating an operating method of the host system according to another example embodiment. Referring to FIG. 13, the host system may be operated as follows.

The host device HOST may request the controller CTRL for SFR setting related to a DMA path (S20). The controller CTRL may set the SFR according to the request from the host device HOST (S21). The controller CTRL may also set the SFR according to an internal policy without the request from the host device HOST.

Thereafter, the host device HOST may transmit a read request to the controller CTRL of the storage device (S22). The controller CTRL may receive the read request and determine a read path corresponding to the SRF (S23). The controller CTRL may transmit a read command corresponding to the read request to the non-volatile memory device NVM (S24). The non-volatile memory device NVM may perform the read operation based on the read command (S25). The non-volatile memory device NVM may output read data to the controller CTRL (S26). The controller CTRL may perform the error correction operation on the read data (S27). The controller CTRL may perform a DMA operation corresponding to the selected read path on the error-corrected data (S28). Here, the DMA operation may be the 1-stage DMA operation or the 2-stage DMA operation. According to the DMA operation, the read data may be output to the host device HOST (S29).

Example embodiments are applicable to a universal flash storage (UFS) system.

Figure 14:
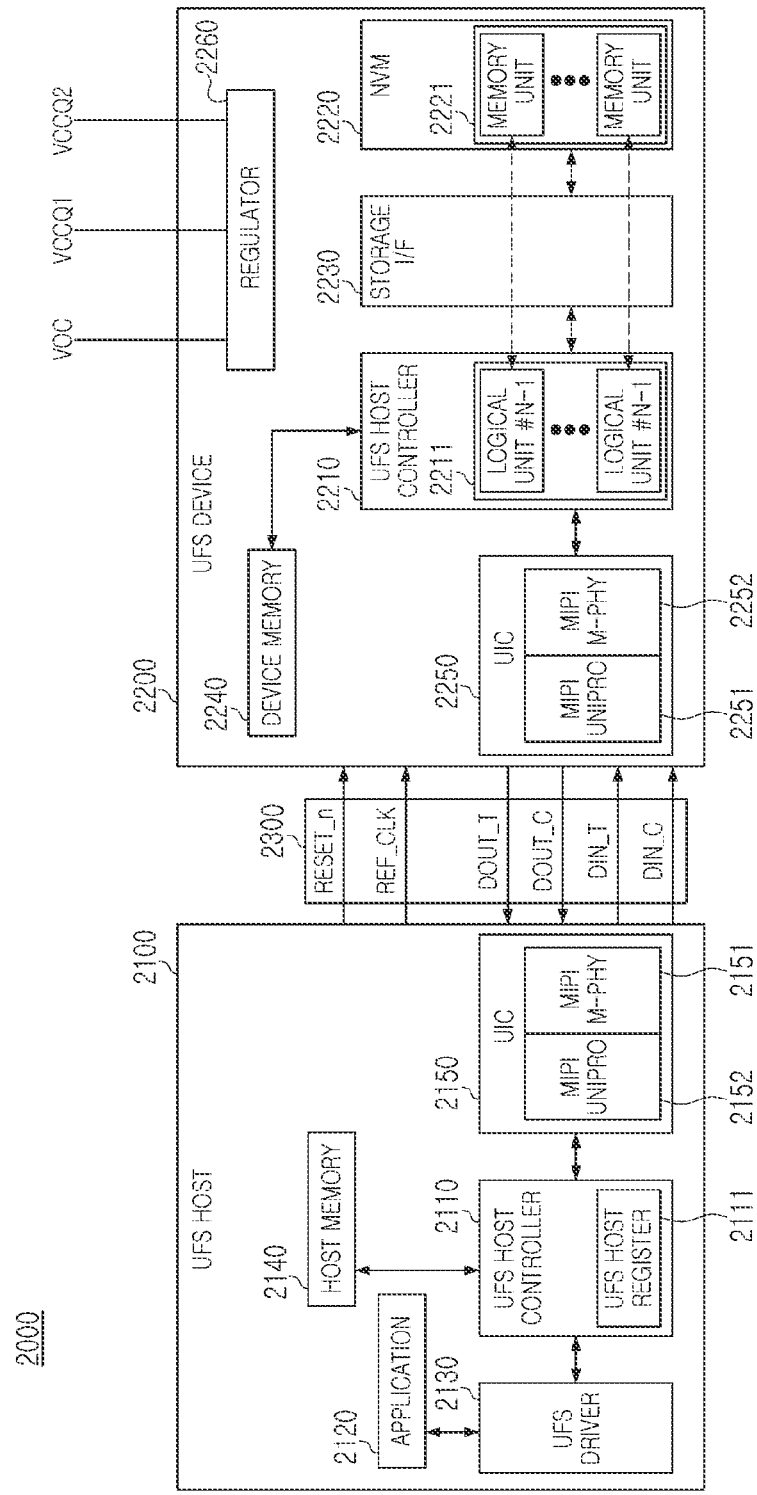
FIG. 14 is a diagram illustrating a universal flash storage (UFS) system 2000 according to an example embodiment.

FIG. 14 is a diagram illustrating a UFS system 2000 according to an example embodiment. The UFS system 2000 may include a UFS host 2100, a UFS device 2200, and a UFS interface 2300. The description of the host system 10 described with reference to FIGS. 1 through 13 may be applied to the UFS system 2000 of FIG. 14. Referring to FIG. 14, the UFS host 2100 and the UFS device 2200 may be interconnected through the UFS interface 2300.

The UFS host 2100 may include a UFS host controller 2110, an application 2120, a UFS driver 2130, a host memory 2140, and a UFS interconnect (UIC) layer 2150. The UFS device 2200 may include a UFS device controller 2210, a non-volatile memory 2220, a storage interface 2230, a device memory 2240, a UIC layer 2250, and a regulator 2260. The non-volatile memory 2220 may include a plurality of memory units 2221, and such a memory unit 2221 may include a V-NAND flash memory having a two-dimensional (2D) structure or a three-dimensional (3D) structure or may include other types of non-volatile memories such as a phase-change random access memory (PRAM) and/or a resistive random access memory (RRAM). The UFS device controller 2210 and the non-volatile memory 2220 may be interconnected through the storage interface 2230. The storage interface 2230 may be implemented to comply with a standard convention such as toggle or open NAND flash interface (ONFI).

The application 2120 may refer to a program that communicates with the UFS device 2200 in order to use a function of the UFS device 2200. The application 2120 may provide an input-output request (IOR) to the UFS driver 2130 for input/output to/from the UFS device 2200. The input-output request (IOR) may refer to a read request, a write request, and/or a discard request for data, but is not limited thereto.

The UFS driver 2130 may manage the UFS host controller 2110 through a UFS-host controller interface (HCI). The UFS driver 2130 may convert the input-output request generated by the application 2120 into a UFS command defined by a UFS standard, and transfer the UFS command to the UFS host controller 2110. One input-output request may be converted into multiple UFS commands. The UFS command may basically be a command defined by a small computer system interface (SCSI) standard, but may also be a command dedicated to the UFS standard.

The UFS host controller 2110 may transmit the UFS command obtained by conversion performed by the UFS driver 2130 to the UIC layer 2250 of the UFS device 2200 through the UIC layer 2150 and the UFS interface 2300. In this process, a UFS host register 2111 of the UFS host controller 2110 may serve as a command queue (CQ).

The UIC layer 2150 of the UFS host 2100 may include MIPI M-PHY 2151 and MIPI UniPro 2152, and the UIC layer 2250 of the UFS device 2200 may also include MIPI M-PHY 2251 and MIPI UniPro 2252.

The UFS interface 2300 may include a line transmitting a reference clock REF_CLK, a line transmitting a hardware reset signal RESET_n for the UFS device 2200, a pair of lines transmitting a pair of differential input signals DIN_T and DIN_C, and a pair of lines transmitting a pair of differential output signals DOUT_T and DOUT_C.

A frequency value of the reference clock REF_CLK provided from the UFS host 2100 to the UFS device 2200 may, for example, be one of four values, 19.2 MHz, 26 MHz, 38.4 MHz, and 52 MHz, but is not necessarily limited thereto. The UFS host 2100 may change the frequency value of the reference clock REF_CLK during operation, that is, during a period in which data transmission/reception is performed between the UFS host 2100 and the UFS device 2200. The UFS device 2200 may generate clocks of various frequencies from the reference clock REF_CLK provided from the UFS host 2100 using a phase-locked loop (PLL) or the like. Further, the UFS host 2100 may also set a value of a data rate between the UFS host 2100 and the UFS device 2200 based on the frequency value of the reference clock REF_CLK. That is, the value of the data rate may be determined depending on the frequency value of the reference clock REF_CLK.

The UFS interface 2300 may support multiple lanes, and each lane may be implemented as a differential line pair. For example, the UFS interface 2300 may include one receive lane and one transmit lane. In FIG. 14, the pair of lines transmitting the pair of differential input signals DIN_T and DIN_C may constitute the receive lane, and the pair of lines transmitting the pair of differential output signals DOUT_T and DOUT_C may constitute the transmit lane. Although one transmit lane and one receive lane are illustrated in FIG. 14, the number of transmit lanes and the number of receive lanes may be modified.

The receive lane and the transmit lane may transmit data in a serial communication manner, and the UFS host 2100 and the UFS device 2200 may communicate with each other in a full-duplex manner by a structure in which the receive lane and the transmit lane are separated from each other. That is, the UFS device 2200 may transmit data to the UFS host 2100 through the transmit lane while receiving data from the UFS host 2100 through the receive lane. In addition, control data such as a command from the UFS host 2100 to the UFS device 2200 and user data that the UFS host 2100 intends to store in or read from the non-volatile memory 2220 of the UFS device 2200 may be transmitted through the same lane. Accordingly, a separate lane for data transmission does not need to be provided between the UFS host 2100 and the UFS device 2200, in addition to a pair of receive lanes and a pair of transmit lanes.

The UFS device controller 2210 of the UFS device 2200 may generally control an operation of the UFS device 2200. The UFS device controller 2210 may manage the non-volatile memory 2220 through logical units (LUs) 2211 which are logical data storage units. The number of LUs 2211 may be eight, but is not limited thereto. The UFS device controller 2210 may include a flash translation layer (FTL), and may convert a logical data address, for example, a logical block address (LBA), transferred from the UFS host 2100, to a physical data address, for example, a physical block address (PBA) using address mapping information of the FTL. In the UFS system 2000, a logical block for storing the user data may have a size in a predetermined range. For example, a minimum size of the logical block may be set to 4 Kbytes. It should be noted that the size of the logical block is not limited thereto.

When a command from the UFS host 2100 is input to the UFS device 2200 through the UIC layer 2250, the UFS device controller 2210 may perform an operation according to the input command, and may transmit a completion response to the UFS host 2100 when the operation is completed.

In an example embodiment, when the UFS host 2100 intends to store the user data in the UFS device 2200, the UFS host 2100 may transmit a data storage command to the UFS device 2200. When a ready-to-transfer response indicating that the UFS device 2200 is ready for reception of the user data is received from the UFS device 2200, the UFS host 2100 may transmit the user data to the UFS device 2200. The UFS device controller 2210 may temporarily store the received user data in the device memory 2240, and may store the user data temporarily stored in the device memory 2240 at a selected position in the non-volatile memory 2220 based on the address mapping information of the FTL.

In an example embodiment, when the UFS host 2100 intends to read the user data stored in the UFS device 2200, the UFS host 2100 may transmit a data read command to the UFS device 2200. The UFS device controller 2210 receiving the data read command may read the user data from the non-volatile memory 2220 based on the data read command and temporarily store the read user data in the device memory 2240. In such a read process, the UFS device controller 2210 may detect and correct an error of the read user data by using a built-in error correction code (ECC) engine.

Specifically, the ECC engine may generate parity bits for write data to be written to the non-volatile memory 2220, and the parity bits generated as described above may be stored in the non-volatile memory 2220 together with the write data. At the time of reading data from the non-volatile memory 2220, the ECC engine may correct an error of the read data by using parity bits read from the non-volatile memory 2220 together with the read data, and output the read data of which the error is corrected.

In addition, the UFS device controller 2210 may transmit the user data temporarily stored in the device memory 2240 to the UFS host 2100. In addition, the UFS device controller 2210 may further include an advanced encryption standard (AES) engine. The AES engine may perform at least one of an encryption operation or a decryption operation for data input to the UFS device controller 2210 by using the symmetric-key algorithm.

The UFS host 2100 may sequentially store commands to be transmitted to the UFS device 2200 in the UFS host register 2111 that may function as the command queue, and sequentially transmit the commands to the UFS device 2200. In this case, even when the previously transmitted command is still being processed by the UFS device 2200, that is, even before a notification indicating that processing of the previously transmitted command by the UFS device 2200 has been completed is received, the UFS host 2100 may transmit the next command queued in the command queue to the UFS device 2200. Accordingly, the UFS device 2200 may receive the next command from the UFS host 2100 while processing the previously transmitted command. The maximum number of commands (queue depth) that may be stored in such a command queue may be, for example, 32. In addition, the command queue may be implemented as a circular queue type that indicates a start and an end of a command string stored in the queue by a head pointer and a tail pointer, respectively.

Each of the plurality of memory units 2221 may include a memory cell array and a control circuit controlling an operation of the memory cell array. The memory cell array may include a two-dimensional memory cell array or a three-dimensional memory cell array. The memory cell array may include a plurality of memory cells. Each of the memory cells may be a single level cell (SLC) storing information of one bit, or may be a cell storing information of two or more bits, such as a multi level cell (MLC), a triple level cell (TLC), or a quadruple level cell (QLC). The three-dimensional memory cell array may include a vertical NAND string vertically oriented so that at least one memory cell is positioned on another memory cell.

VCC, VCCQ, VCCQ2, and the like, may be input to the UFS device 2200 as power supply voltages. VCC is a main power supply voltage for the UFS device 2200 and may have a value of 2.4 V to 3.6 V. VCCQ is a power supply voltage for supplying a voltage in a low range, is mainly for the UFS device controller 2210, and may have a value of 1.14 V to 1.26 V. VCCQ2 is a power supply voltage for supplying a voltage lower than VCC but higher than VCCQ, is mainly for an input/output interface such as the MIPI M-PHY 2251, and may have a value of 1.7 V to 1.95 V The power supply voltages may be supplied to respective components of the UFS device 2200 through the regulator 2260. The regulator 2260 may be implemented as a set of unit regulators connected to different ones of the above-described power supply voltages, respectively.

The storage device according to example embodiments is applicable to a data server system.

Figure 15:
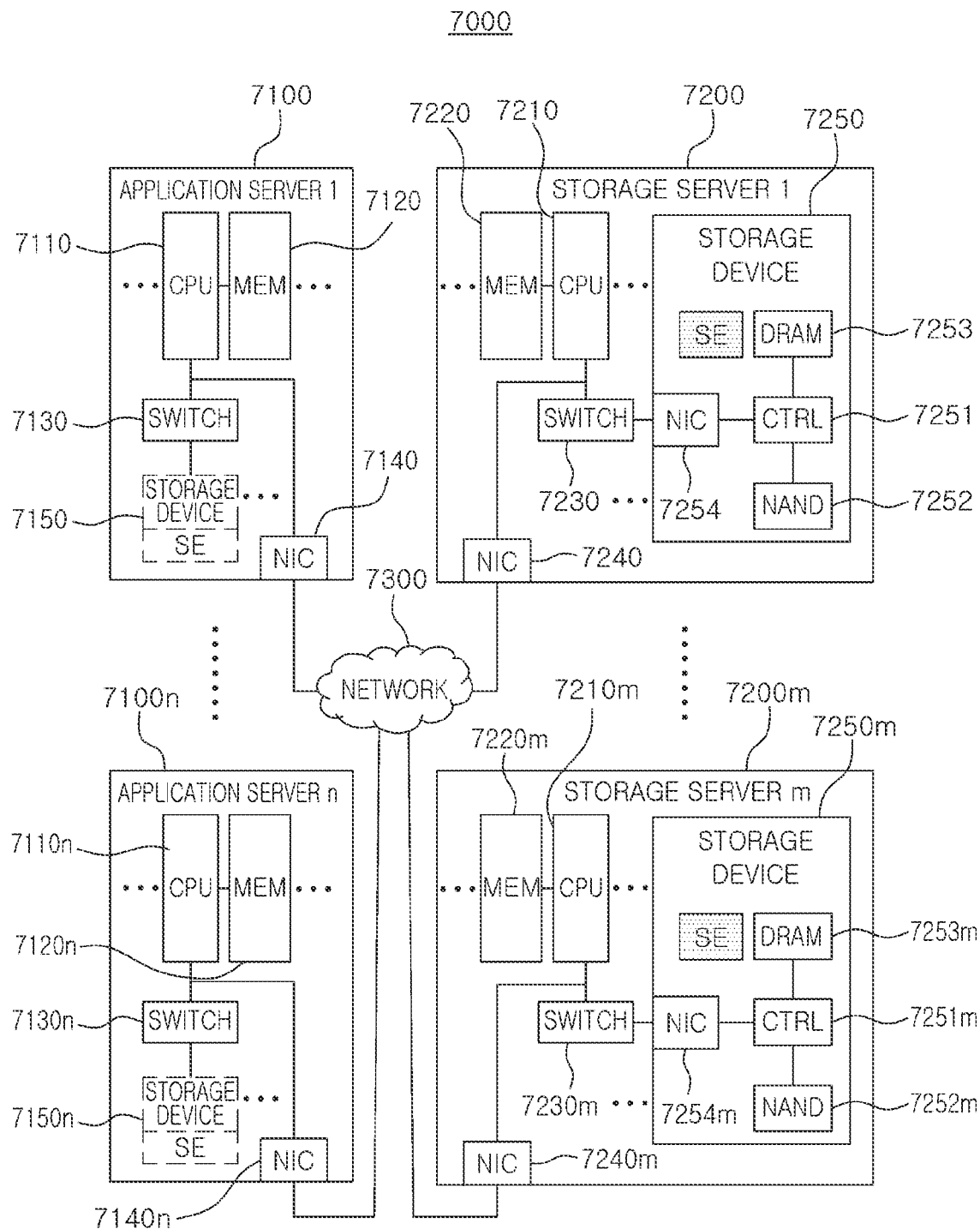
FIG. 15 is a diagram illustrating a data center according to an example embodiment.

FIG. 15 is a diagram illustrating a data center to which the memory device according to an example embodiment is applied. Referring to FIG. 15, a data center 7000 may include application servers 7100 to 7100n and storage servers 7200 to 7200m. The number of application servers 7100 to 7100n and the number of storage servers 7200 to 7200m may be variously selected according to example embodiments, and the number of application servers 7100 to 7100n and the number of storage servers 7200 to 7200m may be different from each other.

The application server 7100 may include at least one processor 7110 and memory 7120. The storage server 7200 may include at least one processor 7210 and memory 7220. Describing the storage server 7200 by way of example, the processor 7210 may control an overall operation of the storage server 7200, and may access the memory 7220 to execute an instruction and/or data loaded to the memory 7220. The memory 7220 may be a double data rate synchronous DRAM (DDR SDRAM), a high bandwidth memory (HBM), a hybrid memory cube (HMC), a dual in-line memory module (DIMM), an Optane DIMM, or a non-volatile DTMM (NVMIDMIM). According to example embodiments, the number of processors 7210 and the number of memories 7220 included in the storage server 7200 may be variously selected. In an example embodiment, the processor 7210 and the memory 7220 may provide a processor-memory pair. In an example embodiment, the number of processors 7210 and the number of memories 7220 may be different from each other. The processor 7210 may include a single-core processor or a multi-core processor. The above description of the storage server 7200 may be similarly applied to the application server 7100. According to an example embodiment, the application server 7100 may not include the storage device 7150. The storage server 7200 may include at least one storage device 7250. The number of storage devices 7250 included in the storage server 7200 may be variously selected according to example embodiments.

The application servers 7100 to 7100n and the storage servers 7200 to 7200m may communicate with each other through a network 7300. The network 7300 may be implemented using the Fiber Channel (FC) or Ethernet. In this case, the FC is a medium used for relatively high-speed data transmission, and an optical switch providing high performance/high availability may be used. According to an access method of the network 7300, the storage servers 7200 to 7200m may be provided as file storage media, block storage media, or object storage media.

In an example embodiment, the network 7300 may be a storage-only network, such as a storage area network (SAN). For example, the SAN may be an FC-SAN that uses an FC network and is implemented according to an FC protocol (FCP). As another example, the SAN may be an IP-SAN that uses a TCP/IP network and is implemented according to an SCSI over TCP/IP or Internet SCSI (iSCSI) protocol. In another example embodiment, the network 7300 may be a general network, such as the TCP/IP network. For example, the network 7300 may be implemented according to protocols such as FC over Ethernet (FCoE), network attached storage (NAS), and NVMe over Fabrics (NVMe-oF). The description of the application server 7100 may be applied to other application servers 7100n, and the description of the storage server 7200 may also be applied to other storage servers 7200m.

The application server 7100 may store data requested to be stored by a user or a client in one of the storage servers 7200 to 7200m through the network 7300. Further, the application server 7100 may acquire data requested to be read by the user or the client from one of the storage servers 7200 to 7200m through the network 7300. For example, the application server 7100 may be implemented by a web server or a database management system (DBMS).

The application server 7100 may access a memory 7120n or a storage device 7150n included in another application server 7100n through the network 7300, or may access memories 7220 to 7220m or storage devices 7250 to 7250m included in the storage servers 7200 to 7200m through the network 7300. Accordingly, the application server 7100 may perform various operations on data stored in the application servers 7100 to 7100n or the storage servers 7200 to 7200m.

For example, the application server 7100 may execute a command for moving or copying data between the application servers 7100 to 7100n or the storage servers 7200 to 7200m. At this time, data may be moved from the storage devices 7250 to 7250m of the storage servers 7200 to 7200m to the memories 7120 to 7120n of the application servers 7100 to 7100n directly or through the memories 7220 to 7220m of the storage servers 7200 to 7200m. The data moving through the network 7300 may be encrypted data for security or privacy.

Describing the storage server 7200 by way of example, an interface 7254 may provide a physical connection between the processor 7210 and a controller 7251 and a physical connection between a network interface card (NIC) 7240 and the controller 7251. For example, the interface 7254 may be implemented in a direct attached storage (DAS) manner in which the storage device 7250 is directly connected using a dedicated cable. Further, for example, the interface 1254 may be implemented in various interface manners such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVM express (NVMe), an institute of electrical and electronic engineers (IEEE) 1394, a universal serial bus (USB), a secure digital (SD) card, a multi-media card (MMC), an embedded multi-media card (eMMC), a universal flash storage (UFS), an embedded UFS (eUFS), and a compact flash (CF) card interface.

The storage server 7200 may further include a switch 7230 and the NIC 7240. The switch 7230 may selectively connect the processor 7210 and the storage device 7250 to each other or selectively connect the NIC 7240 and the storage device 7250 to each other under the control of the processor 7210.

In an example embodiment, the NIC 7240 may include a network interface card, a network adapter, and the like. The NIC 7240 may be connected to the network 7300 by a wired interface, a wireless interface, a Bluetooth interface, an optical interface, or the like. The NIC 7240 may include an internal memory, a digital signal processor (DSP), a host bus interface, and the like, and may be connected to the processor 7210 or the switch 7230 through the host bus interface. The host bus interface may be implemented by one of the examples of the interface 7254 described above. In an example embodiment, the NIC 7240 may be integrated with at least one of the processor 7210, the switch 7230, or the storage device 7250.

In the storage servers 7200 to 7200m or the application servers 7100 to 7100n, the processor may transmit a command to the storage devices 7150 to 7150n and 7250 to 7250m or the memories 7120 to 7120n and 7220 to 7220m to program or read data. In this case, the data may be data error-corrected through the ECC engine. The data may be data subjected to data bus inversion (DBI) or data masking (DM), and may include cyclic redundancy code (CRC) information. The data may be encrypted data for security or privacy.

The storage devices 7150 to 7150m and 7250 to 7250m may transmit a control signal, a command, and an address signal to NAND flash memory devices 7252 to 7252m based on the read command received from the processor. Accordingly, when data are read from the NAND flash memory devices 7252 to 7252m, the RE signal may be input as a data output control signal and serve to output the data to a DQ bus. The DQS may be generated using the RE signal. The command and the address signal may be latched by the page buffer according to a rising edge or a falling edge of the WE signal.

In an example embodiment, the storage devices 7150 to 7150m and 7250 to 7250m may selectively apply the read path described with reference to FIGS. 1 through 13.

The controller 7251 may control an overall operation of the storage device 7250. In an example embodiment, the controller 7251 may include an SRAM. The controller 7251 may write data to the NAND flash 7252 based on a write command, or may read data from the NAND flash 7252 based on a read command. For example, the write command or the read command may be provided from the processor 7210 in the storage server 7200, the processor 7210m in another storage server 7200m, or the processors 7110 and 7110n in the application servers 7100 and 7100n. A DRAM 7253 may temporarily store (buffer) data to be written to the NAND flash 7252 or data read from the NAND flash 7252. In addition, the DRAM 7253 may store metadata. Here, the metadata may be the user data or data generated by the controller 7251 to manage the NAND flash 7252.

In the storage device and the operating method thereof according to an example embodiment, the LDPC output SRAM may be used as a read buffer, thereby reducing or eliminating a dedicated read buffer.

In the storage device and the operating method thereof according to an example embodiment, the read path may be selected from among two paths according to the attribute of the host command and the need of the user.

As set forth above, according to example embodiments, a controller controlling a non-volatile memory device, a storage device including the same, and an operating method thereof may optimize a read path according to attribute of a read request and a need of a user in a read operation, thereby reducing read latency, which may lead to performance improvement.

While aspects of example embodiments have been shown and described, it will be apparent to those skilled in the art that modifications and variations could be made without departing from the scope of the appended claims.

What is claimed is:

1. A controller configured to control at least one non-volatile memory device, the controller comprising:
   at least one processor;
   a host interface circuit configured to interface with a host device;
   a non-volatile memory interface circuit configured to interface with the at least one non-volatile memory device;
   a buffer memory;
   an error correction circuit comprising an output buffer, wherein the error correction circuit is configured to correct an error in data read from the at least one non-volatile memory device;
   a host direct memory access (DMA) circuit configured to directly access the output buffer of the error correction circuit and the buffer memory through the host interface circuit; and
   a non-volatile memory (NVM) DMA circuit configured to directly access the at least one non-volatile memory device through the non-volatile memory interface circuit,
   wherein the host DMA circuit is further configured to, based on a read path corresponding to a 1-stage DMA operation, directly obtain read data stored in the output buffer of the error correction circuit and provide the read data to the host interface circuit, and wherein the host DMA circuit is further configured to, based on the read path corresponding to a 2-stage DMA operation, control the read data stored in the output buffer of the error correction circuit to be stored in the buffer memory, obtain the read data from the buffer memory and output data of the buffer memory to the host interface circuit.

2. The controller of claim 1, further comprising a host DMA manager configured to control the host DMA circuit.

3. The controller of claim 2, wherein the host DMA manager is further configured to select a first read path corresponding to the 1-stage DMA operation as the read path based on a read request being a random read request.

4. The controller of claim 2, wherein the host DMA manager is further configured to select the read path corresponding to one from among the 1-stage DMA operation and the 2-stage DMA operation by reading at least one special feature register (SFR).

5. The controller of claim 2, wherein the host DMA manager includes a path determination engine that determines the read path.

6. The controller of claim 5, wherein the path determination engine selects the read path according to a random read request from the host device.

7. The controller of claim 5, wherein the path determination engine selects the read path according to a value stored in at least one special feature register (SFR).

8. The controller of claim 7, wherein the at least one SFR is set according to a request of the host device or an internal policy of the controller.

9. The controller of claim 2, wherein the host DMA manager is implemented in hardware, software, or firmware.

10. The controller of claim 1, wherein a size of the read data stored in the output buffer is smaller than a size of the data of the buffer memory.

11. A method of operating a controller, the method comprising:
receiving a read request from a host device;
selecting one of a first read path and a second read path as a read path by a path determination engine; and
outputting read data to the host device using the selected read path in response to the read request,
wherein the first read path corresponds to a 1-stage DMA operation directly for obtaining the read data stored in an output buffer of an error correction circuit, and
wherein the second read path corresponds to a 2-stage DMA operation for controlling the read data stored in the output buffer of the error correction circuit to be stored in a buffer memory.

12. The method of claim 11, wherein the selecting the read path includes determining an attribute of the read request.

13. The method of claim 11, wherein the path determination engine determines whether the read request is a random read request and selects the read path according to a determination result.

14. The method of claim 11, further comprising reading a value in at least one special feature register (SFR),
wherein the path determination engine selects the read path according to the value of the at least one SFR.

15. The method of claim 14, further comprising setting the at least one SFR according to a request of the host device or an internal policy of the controller.

16. A controller comprising:
a plurality of flash memory controllers connected a plurality of channels;
a plurality of error correction circuits configured to correct errors of read data from corresponding flash memory controllers;
a buffer memory configured to store data from an output buffer of at least one error correction circuit among the plurality of error correction circuits; and
a host direct memory access (DMA) manager configured to access the output buffer by amount of data of a first size using a first read path and access the buffer memory by amount of data of a second size using a second read path,
wherein the host DMA manager receives a read request from a host device and selects one of the first read path corresponds to a 1-stage DMA operation and wherein the second read path corresponds to a 2-stage DMA operation.

17. The controller of claim 16, wherein the first size is 4 kilobytes and the second size is 32 kilobytes.

18. The controller of claim 16, wherein the host DMA manager includes a path determination engine that determines a read path of the read request.

19. The controller of claim 18, wherein the path determination engine selects the read path according to a random read request from the host device.

20. The controller of claim 18, wherein the path determination engine selects the read path according to a value stored in at least one special feature register (SFR).

* * * * *